United States Patent [19]

Rawson et al.

[11] 3,708,785

[45] Jan. 2, 1973

[54] DATA SCANNER FOR REAL TIME INTERFACING OF A COMPUTER AND PLURAL REMOTE UNITS

[75] Inventors: Edward B. Rawson, Lincoln; Joseph B. Ferguson, Harvard, both of Mass.

[73] Assignee: Searle Medidate Inc., Waltham, Mass.

[22] Filed: July 31, 1970

[21] Appl. No.: 59,996

[52] U.S. Cl. .......... 340/172.5
[51] Int. Cl. .......... G06f 5/04
[58] Field of Search .......... 340/172.5

[56] References Cited

UNITED STATES PATENTS

| | | | |
|---|---|---|---|
| 3,331,055 | 7/1967 | Betz et al | 340/172.5 |
| 3,350,697 | 10/1967 | Hirvela | 340/172.5 |
| 3,040,299 | 6/1962 | Crosby, Jr. et al. | 340/172.5 |
| 3,409,877 | 11/1968 | Alterman et al | 340/172.5 |
| 3,245,038 | 4/1966 | Stafford et al | 340/172.5 |
| 3,312,950 | 4/1967 | Hillman et al. | 340/172.5 |
| 3,331,060 | 7/1967 | Willis | 340/172.5 |
| 3,509,539 | 4/1970 | Fichten et al | 340/172.5 |
| 3,573,740 | 4/1971 | Berger | 340/172.5 |
| 3,596,256 | 7/1971 | Alpert | 340/172.5 |
| 3,618,039 | 11/1971 | Baltzly | 340/172.5 |

*Primary Examiner*—Harvey E. Springborn
*Attorney*—Joseph Weingarten

[57] ABSTRACT

A data scanner for providing real time communication between a computer and a plurality of remote stations and for providing control of each of the stations. The data scanner channels two-way communication between the computer and remote stations through a single register-storage system which effects parallel/serial data conversions and provides a tapable source for data monitoring. An interrupt system responds to both computer and station signals to provide conditional and uncondition interrupts for servicing stations depending on computer status.

10 Claims, 5 Drawing Figures

INVENTORS
EDWARD B. RAWSON
J. BRINTON FERGUSON
BY
ATTORNEYS

INVENTORS
EDWARD B. RAWSON
J. BRINTON FERGUSON
BY
ATTORNEYS

INVENTORS
EDWARD B. RAWSON
J. BRINTON FERGUSON
BY
ATTORNEYS

DATA SCANNER FOR REAL TIME INTERFACING OF A COMPUTER AND PLURAL REMOTE UNITS

FIELD OF THE INVENTION

This invention relates to data processing systems and more particularly to a data scanner for real time communication with a plurality of remote stations.

BACKGROUND OF THE INVENTION

In multi-station data systems, a plurality of stations are communicative with a central computer which sends appropriate instructions to the several stations, receives information from the stations and governs overall system operation. One such multi-station system especially adapted for multi-phasic health screening is described in copending patent application Ser. No. 759,389, filed Sept. 12, 1968, now U.S. Pat. No. 3,566,365 and assigned to the assignee of the present invention. In this system each remote station is operative to provide data representative of a particular medical test and to convey this data to a central computer which is operative to govern station operation accordingly. In order to conserve computer time and to simplify operation of the computer itself it is often useful to employ a data scanner as an interface between the computer and the several stations. Such a scanner acts as a buffer between the stations and the computer and can enhance the efficiency of the computer in the data handling system.

SUMMARY OF THE INVENTION

In accordance with the present invention a data scanner is provided which is operative to provide real time communication between a computer and a plurality of stations and to provide common control of all of the stations. Each station is able by virtue of the novel scanner to use the direct memory access of a computer on a time division basis. The scanner is especially adapted for use with a health screening system such as described in the above-identified copending patent application, but is equally suited to use in any multi-station data handling system in which efficient real time station control is required.

The scanner addresses the stations sequentially and during the time the scanner is communicative with each station command information is conveyed to that station and information transmitted from the station is received by the scanner and directed to the computer for processing. During each time slot associated with a respective station, the scanner fetches from the computer memory message words for transmission to the station. Information received from a station is directed to appropriate locations in the computer memory during this same time slot. During each time slot the scanner also fetches from the computer memory a state word which controls the generation of program interrupts by the scanner. When the computer receives a program interrupt signal the computer automatically stops or interrupts its normal program for a time sufficient to service the interrupting scanner. When the computer has completed the servicing routine, the computer returns to its normal program which was being run before the interrupt occurred.

The scanner includes means for manually generating signals for testing scanner operation and means for monitoring data flowing through the scanner so that an operator can readily ascertain improper system operation and take appropriate corrective measures.

DESCRIPTION OF THE DRAWINGS

The invention will be more fully understood from the following detailed description taken in conjunction with the accompanying drawings, in which.

DETAILED DESCRIPTION OF THE INVENTION

Figure 1:
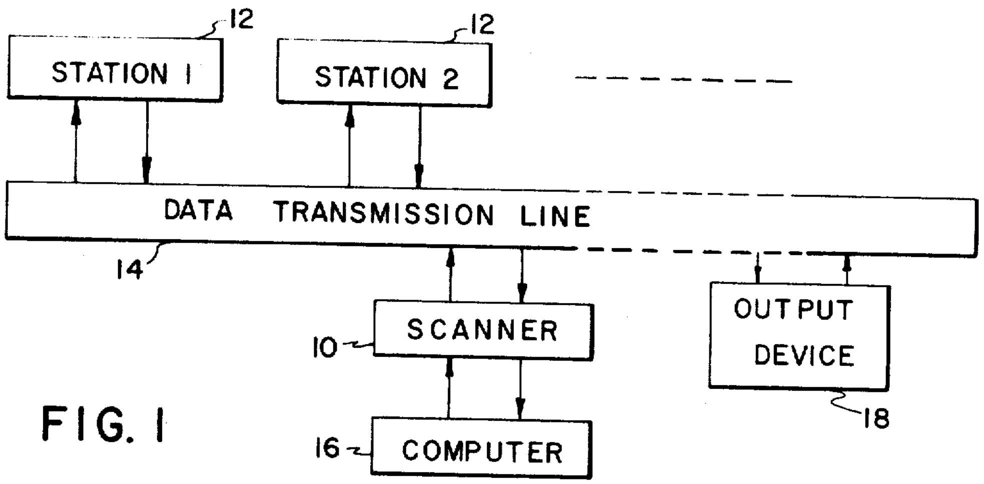
FIG. 1 is a block diagram of a multi-station data system embodying the invention.

A multi-station data system in which the invention is employed is illustrated in FIG. 1. The scanner 10 is coupled to each of a plurality of stations 12 via a data transmission line 14 which usually includes a transmitting and a receiving line, and is operative to convey information to the respective stations and to receive information from these stations. Scanner 10 is also coupled to a computer 16 which includes a suitable memory of a capacity sufficient to accommodate system requirements. The computer is of the type having a direct memory access such as a Digital Equipment Corporation Model PDP-8I. The stations connected to the transmission line can include suitable output devices such as a teletypewriter 18 for printing out information from the computer. Each of the stations 12 can have different data requirements and may be conveying different types of data to the computer, and according to the invention, the scanner 10 is operative to easily accommodate the respective data requirements of the several stations.

The stations 12 are sequentially addressed by scanner 10 in accordance with station address information derived from computer 16. Scanner 10 is communicative with each station 12 for a selected period of time, hereinafter referred to as a time slot, and during each time slot the scanner conveys command information to the station and receives from the station information to be conveyed to computer 16 for storage or processing. The sequential transmission of station addresses is received by all stations but only that station receiving its unique address is enabled for communication with scanner 10. Scanner 10 thus is always on-line with all of the stations but information is conveyed only to and from a station having the corresponding address.

Figure 2:
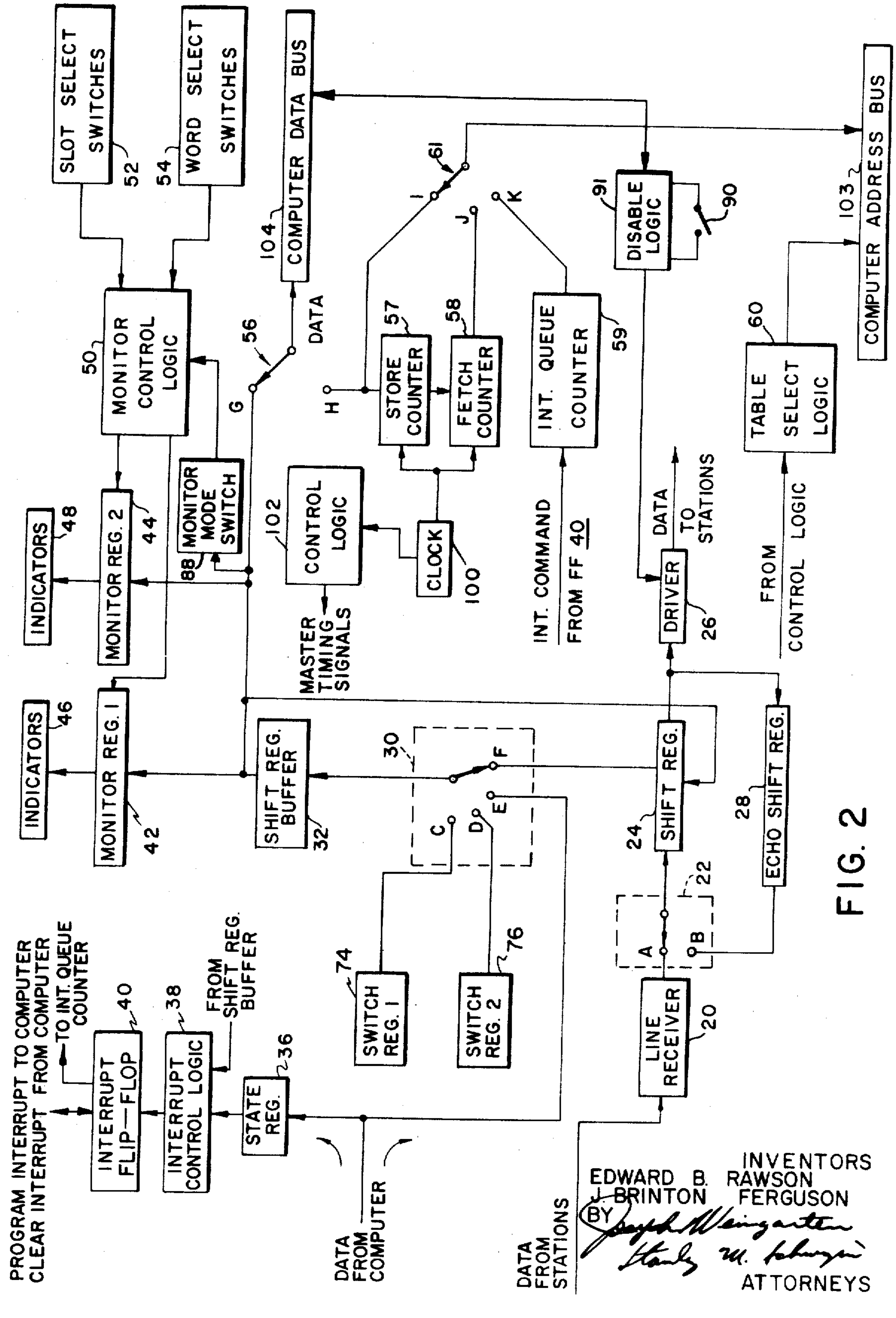
FIG. 2 is a block diagram of a scanner according to the invention.

The scanner logic is illustrated in detail in FIG. 2. Data from the stations is received by a line receiver 20 coupled to the data transmission line 14 (FIG. 1) and operative to provide signal levels suitable for subsequent logical processing. Line receiver 20 is, in turn, coupled via a switching network 22 to a shift register 24, the serial output of which is coupled to a driver 26 operative to transmit data to the several stations on the system transmission line 14. For purposes of illustration, switching network 22 is represented as a mechanical switch; it is understood however that in practice the switching function would be implemented electronically, as would other switching functions to be described hereinafter. The output of shift register 24 is coupled to the input of an echo shift register 28, the output of which is coupled to terminal B of switching network 22. The echo shift register is employed for scanner testing which will be described subsequently. Data from the stations being processed by line receiver 20, shift register 24, driver 26 and echo shift register 28 is in serial form. The data flow to be presently described will be recognized to be in parallel form.

Shift register 24 is coupled via a switching network 30 to a shift register buffer 32, the output of shift register buffer 32 is in turn coupled back to the parallel input of shift register 24. It will be appreciated that shift register 24 and shift register buffer 32 are operative to provide parallel exchange of data therebetween. A first switch register 74 is coupled to an input terminal C of switching network 30, while a second switch register 76 is coupled to an input D thereof. Registers 74 and 76 permit entry of test data. Terminal E of switch network 30 is coupled to the computer data output line and to a state register 36 which, in turn, is coupled to interrupt control logic 38. Logic 38 is coupled to an interrupt flip-flop 40 operative to provide program interrupt signals to the computer and to accept clear interrupt signals from the computer. Parallel data from the computer is coupled to state register 36 and switching network 30 for processing by the scanner.

The output of shift register buffer 32 is also applied to first and second monitor registers 42 and 44 which drive respective indicators 46 and 48. The monitor registers are provided to monitor data flowing through the scanner and are controlled by suitable signals from monitor control logic 50 which is operative in accordance with slot select switches 52 and word select switches 54 located on the control panel of the scanner and by which particular time slots and data words are selected for monitoring purposes, to be described. Parallel data from the scanner to the data bus 104 of the computer is provided by the parallel output from shift register buffer 32 transmitted by way of switching network 56.

The store counter 57 determines the address where data is to be stored in the computer, while fetch counter 58 determines the address of fetched data. Counter 58 is free running and increments at a rate of typically, every millisecond. The computer core memory includes an input table for the two computer-bound words, an output table for the two terminal-bound words, a state table and an interrupt queue table. System timing is accomplished in the following manner. A clock 100 drives control logic 102 which provides master timing to scanning circuitry. Clock 100 also drives store counter 57 and fetch counter 58. The store counter 57 is also coupled to fetch counter 58 such that the count held by store counter 57 is equal to the count held by fetch counter 58 during the previous slot. That is, counters 57 and 58 operate essentially one count out of step with one another. Interrupt commands from interrupt flip-flop 40 cause an interrupt queue counter 59 to be incremented upon each command from flip-flop 40. Signals from control logic 102 also govern operation of table select logic 60. Counters 57, 58, and 59 are coupled to respective terminals of a switching network 61, the common output of which is coupled to the computer address bus 103. Switching network 61 is in practice an electronic switch, the mechanical switch being illustrated for purposes of clarity only. The output of table select logic 60 is also coupled to the computer address bus 103. At selected times, logic 60 addresses an appropriate input or output table of the computer memory for fetching or storing data. When an interrupt occurs, switching network 61 is set to terminal K to permit counter 59 to direct an address to the computer, this address being the core location where the slot number provided by store counter 57 is to be stored. The slot number is transferred as data to the interrupt queue table. The interrupt queue counter 59 need not be initialized or cleared and its contents need not be conveyed as data to the computer, since a simple program will permit inference of the counter contents by examination of the interrupt queue table in computer memory.

Before considering the detailed operation of the scanner, it will be helpful to contemplate the data format employed. Typically, 48 time slots are provided, during each of which the scanner fetches from the computer memory two 12 bit terminal-bound words for serial transmission to the stations. During each of the time slots the scanner also receives two computer-bound words from the associated stations and directs these computer-bound words to the computer memory for storage. A different station is addressed during each time slot. Two additional time slots can be provided for test functions, as will be described.

Figure 3:
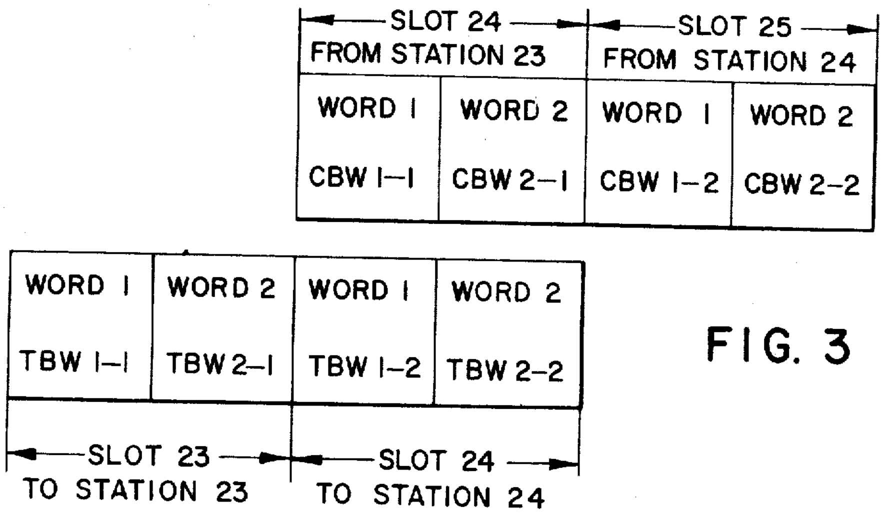
FIG. 3 is a diagrammatic representation of the message format employed in the invention.

Each station is scanned, for example, at a rate of 20 times per second. The scanner also generates clock pulses for transmission to the several stations. During the time slot in which the scanner is conveying data words to a station, the scanner is also processing data words from a different station which was interrogated during the previous time slot. Referring to FIG. 3, there is shown the data word formats present during adjacent time slots. During time slot 24 from station 23, the scanner receives two computer-bound words, designated CBW1-1 and CBW2-1, for transmission to the computer. During the same time period, two data words, designated TBW1-2 and TBW2-2, are processed for transmission to station 24. Data for station 23 is processed during the previous time slot 23, while data from station 24 is processed during the later time slot 25. Thus, it is evident that the scanner is simultaneously processing data from one station and data for a different station at any instant in time. The scanner is also receiving the relatively slower serial data from the stations and is transmitting serial data to the stations during the time that parallel processing is continuing.

Figure 4:
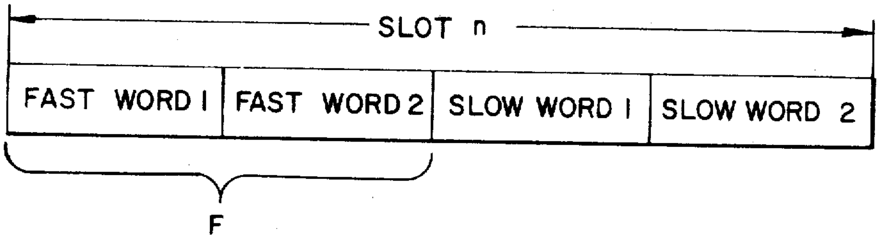
FIG. 4 is a diagrammatic representation of an alternative message format.

An alternative data format for a time slot is illustrated in FIG. 4 in which a portion F of the slot n is employed for additional data. The slow words are the data words as described above which are sampled once per scan. The fast words occupy a portion F of each time slot such that this faster data can be sampled during each slot. In this way, the scanner can accommodate faster data from a particular station.

In operation, data from a station is applied by way of line receiver 20 and switching network 22 to shift register 24, and the data loaded into shift register 24 is then transferred in parallel form to shift register buffer 32. Data from the computer is also loaded into shift register buffer 32 by way of switching network 30. Data from the computer is also applied to state register 36 to store a state word for control of appropriate computer program interrupts. The data in shift register 24 is conveyed to shift register buffer 32 while the data in shift register buffer 32 is conveyed to shift register 24. In other words, the data contents of shift register 24 and shift register buffer 32 are exchanged, and in this manner the data from the stations is directed by buffer 32 back to the computer for processing, while the data from the computer is directed by shift register 24 to driver 26 for serial transmission to a station.

The contents of shift register buffer 32 are also applied to monitor registers 42 and 44 which are also enabled by slot select switches 52 and word select switches 54 to display by means of indicators 46 and 48 on the scanner panel the data flowing through buffer 32 thereby to monitor scanner operation. The interrupt flip-flop 40 is set by a signal from interrupt control logic 38 which is operative in response to signals from state register 36 and from information in the data word in shift register buffer 32. Setting of interrupt flip-flop 40 causes an indication to the computer that servicing of the scanner is required.

The state word which is transferred from the computer to state register 36 controls when a computer interrupt is to be generated. Typically, the state word is a two bit word which can indicate a conditional or an unconditional program interrupt. For example, the presence of a binary 1 in a predetermined bit position of the state word can indicate an unconditional interrupt, while the presence of a binary 1 in the other bit position can indicate an interrupt if an appropriate signal from a station indicates that the station requires service. Usually, a single bit of a data word from a station indicates whether or not the station requires service, that is, whether the station requires instructions from the computer or whether the station has data for transmission to the computer. It will be noted that program interrupts are directed to the computer only by way of the scanner.

In order for the computer to identify which station is requesting service, the scanner directs the contents of store counter 57, which is the slot number, to an interrupt queue table in the computer memory. The numbers of the slots requiring service are sequentially placed in successive memory locations by the scanner and are removed from memory in the same order by the computer as the stations represented by these slots are serviced. One or more time slots are provided during which data is processed from panel switches rather than from the computer in order to provide for a scanner testing routine, as will be described.

Figure 5:
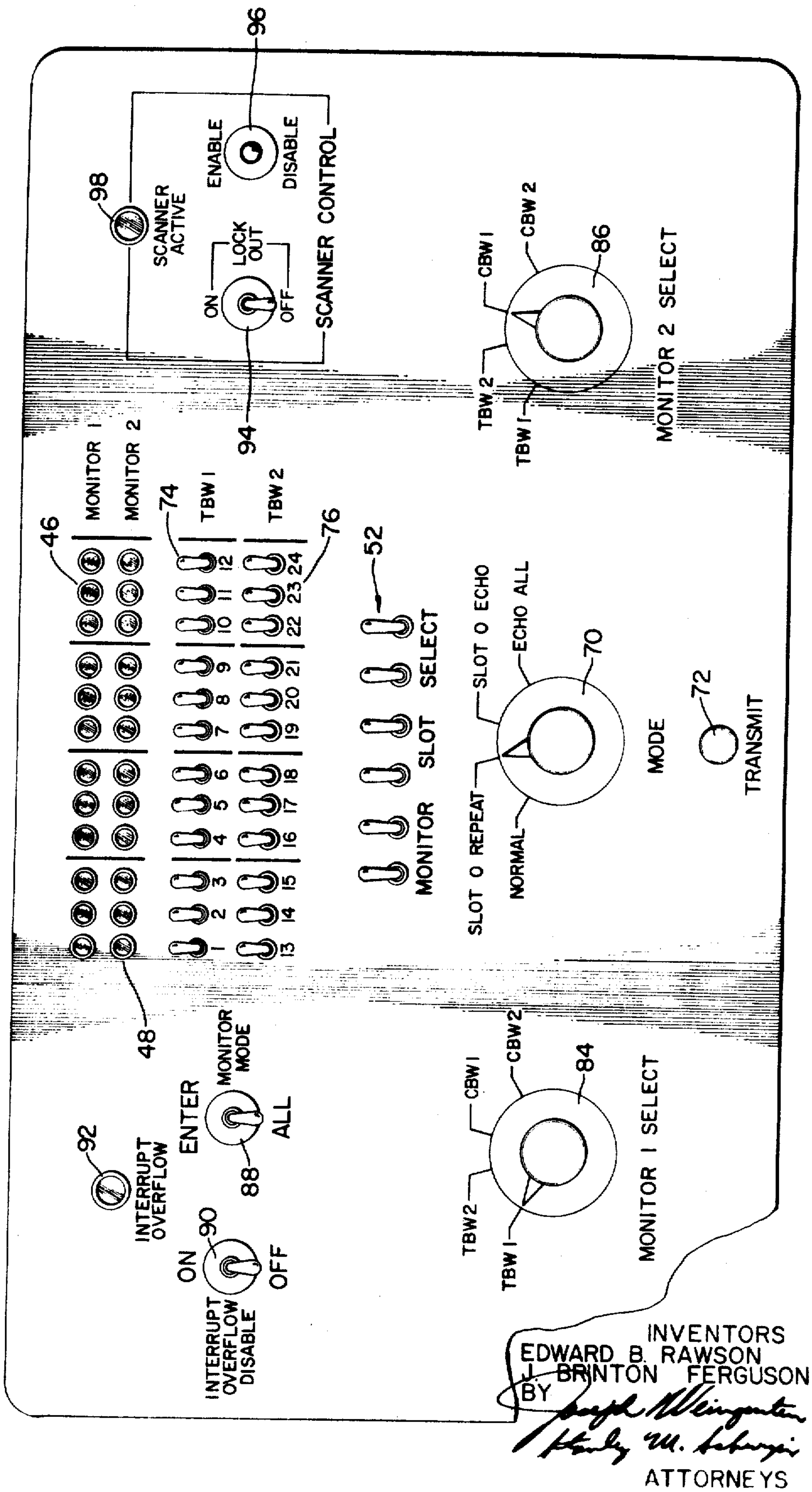
FIG. 5 is an elevation view of the control panel of a scanner embodying the invention.

The control panel of the scanner illustrating the operating controls and indicators is depicted in FIG. 5. A MODE switch 70 is operative in a NORMAL position to permit usual scanner operation except when a TRANSMIT button 72 is depressed at which time two data words as determined by the setting of switch registers 74 and 76 are transmitted to shift register buffer 32 during slot 0. The MONITOR SLOT SELECT switches 52 are binary coded switches for selection of a time slot in which monitor registers 42 and 44 are loaded. The indicators 46 and 48 denote the contents of monitor registers 42 and 44, respectively. The MONITOR 1 select switch 84 selects a terminal-bound word or computer-bound-word to be loaded into monitor register 42 during the selected slot, while MONITOR 2 select switch 86 provides a similar function for monitor register 44, and correspond to switches 54 of FIG. 2.

The INTERRUPT OVERFLOW DISABLE switch 90 in the ON position causes deactivation of the scanner upon failure of the computer to service an interrupt generated by the scanner. Upon such deactivation, resulting for example by reason of a computer failure, the INTERRUPT OVERFLOW indicator 92 is illuminated and data is not transferred between the stations and the computer. With switch 90 in the OFF position, the scanner will not sense an interrupt overflow condition as the automatic disabling logic 91 is not utilized.

The MONITOR MODE switch 88 in the ALL position permits loading of monitor registers 42 and 44 in the time slot selected by MONITOR SLOT SELECT switches 52. In the ENTER position, switch 88 allows loading of monitor registers only if a selected bit in the received computer-bound-word is set, which usually occurs if the station requires service. This feature permits the monitoring of single transmissions between a station and the computer.

The panel switch 96 is spring-loaded with a center rest position and causes manual enabling or disabling of the scanner by appropriate actuation of the switch lever. With the switch in its center position, the scanner is enabled or disabled via appropriate computer instructions. The LOCK OUT switch 94 in the ON position prevents enabling of the scanner either by the computer or manually. With switch 94 in the OFF position, manual or computer controlled enabling or disabling of the scanner is permitted in the usual manner. When the scanner is active, that is when data is being transferred between the stations and the computer, an indicator 98 is illuminated.

As noted hereinabove, one or more time slots can be provided for purposes of scanner testing. In the illustrated embodiment, slot 0 and slot 1 are designated as test slots. The echo shift register 28 is employed for overall functional testing of the scanner. During slot 1, data words in shift register 24 are transferred to echo shift register 28 and thence back into shift register 24. The data words sent to the computer can be compared with output words if this additional mode of testing is desired. For other time slots, the particular testing mode is governed by MODE switch 70. With switch 70 in the NORMAL position, the scanner operates as described hereinabove, except that depression of transmit button 72 causes two data words as determined by switch registers 74 and 76 to be transmitted to shift register buffer 32 during slot 0. In the SLOT 0 REPEAT position, switch 70 permits the data words selected by switches 74 and 76 to be loaded into shift register buffer 32 each time slot 0 is present, whether or not transmit button 72 has been depressed. With switch 70 in the SLOT 0 ECHO position, the manually selected words are echoed via echo shift register 28 in slot 0. In the ECHO ALL position, switch 70 is operative to cause all output to be shifted through echo shift register 28. The output words are provided from the computer in all time slots except slot 0 when the words are as selected by panel switches 74 and 76. Typical components for the block elements of FIG. 2 which are generally available can include: Low Cost Computer Clock, Series 90 of the Acutronics Division of Gibbs Mfg. and Res. Corp. for the clock 100; Model 9309, MSI Dual 4-Input Multiplexer of the Fairchild Semiconductor Division of Fairchild Camera and Instrument Corporation for the switch 30, table select logic 60, and switch 61; Model 9316 MSI 4-Bit Binary Counter of the Fairchild Semiconductor Division for the counters 57, 58, and 59; Model LM 311 Voltage Comparator of the National Semiconductor Corp. for the line receiver 20; one of the 9,000 Series TT Micro-L Integrated Circuit Flip-Flops of the Fairchild Semiconductor Division for the flip-flop 40 and disable logic 91; selections from the Series 9,000 TT Micro-L Integrated Circuit Logic Gates and/or Extenders of the Fairchild Semiconductor Division for the control logic 38 and control logic 102; Model 3,900 MSI 4-Bit Shift Register of the Fairchild Semiconductor Division for the shift registers 24 and 28 and for the registers or buffers 32, 42 and 44; a Model SG-351 or SG- 353 of the Sylvania Semiconductor Division for the driver 26; and a Model 4510 MICROMATRIX comparator of the Fairchild Semiconductor Division for the monitor control logic 50. The actual logic function provided by the control logic 38 is exemplified by the logic system indicated on page 173 of Herbert Hellerman, Digital Computer System Principles, McGraw-Hill, 1967. The register 36 is exemplified by a simple single bit loadable flip-flop of the type shown at page 247 of the above referenced Digital Computer System Principles or page 412 of J. Millman and H. Taub, Pulse and Digital Circuits, McGraw-Hill, 1956.

Various modifications and alternative implementations will occur to those versed in the art without departing from the spirit and true scope of the invention. Accordingly, it is not intended to limit the invention by what has been particularly shown and described except as indicated in the appended claims.

What is claimed is:

1. In a system for sequentially addressing a plurality of stations and for providing real time, time-shared simultaneous two-way communication between a computer and each of said stations during respective time slots, a data scanner comprising:

means for receiving serial data from said stations in sequential time slots corresponding to the different stations;

means for transmitting serial data to said stations in sequential time slots corresponding to the different stations;

first storing means operative in response to serial data received from each of said stations and having predetermined plural data storage elements storing sequential elements of said data in the received sequence;

said first storing means further including means operative in association with said serial data transmitting means for sequentially transferring stored elements of said data from its plural data storage elements to said transmitting means in a sequence for serial transmission;

means for operating said first storing means for the simultaneous transferring and storing of said sequential elements in the plural data storage elements of said first storage means;

means for buffer storing parallel data and having plural data storing elements;

means for accepting parallel data from said computer for storage in said buffer storing means in its plural data storing elements;

means for conveying parallel data to said computer from said plural data storing elements of said buffer storing means;

means for exchanging data between data storing elements of said first storing means and said buffer storing means;

means for generating an interrupt condition signal in response to predetermined signals from said computer and said stations;

means responsive to said interrupt condition signal for providing an indication of a sequence of stations to be communicated with;

means operative in response to the indication of said sequence of stations for indicating time slot addresses of the stations to be communicated with thereby to identify the stations having data to said computer and the stations which are to receive data from said computer; and monitor means for providing an indication of the data flowing through said data scanner.

2. The invention in accordance with claim 1 wherein said monitor means includes:

storage means for storing system data associated with said stations which are being communicated with; and indicator means for displaying the data contents of said storage means.

3. The invention in accordance with claim 1 wherein said first storing means includes:

a shift register responsive to said operating means to shift in the received serial data from said stations at a serial input and to shift out serial data to said stations from a serial output.

4. The invention in accordance with claim 3 wherein said monitoring means includes:

first and second monitor registers coupled to said buffer storing means; and means for selecting a predetermined time in the time slots which is operative to cause said monitor registers to store data contained in said buffer storing means during said predetermined time.

5. The invention in accordance with claim 1 wherein said interrupt condition signal generating means includes:

a state register operative to detect and store interrupt data words from said computer for control of computer program interrupt commands; and interrupt control logic operative in response to a data word from said state register and to a predetermined portion of data from each of said stations to provide an interrupt command to said computer.

6. In a system for sequentially addressing a plurality of stations and for providing real time communication between a computer and each of said stations during respective time slots, a data scanner comprising:

means for transmitting serial data to each of said stations;

means for receiving serial data from each of said stations;

means for accepting parallel data from said computer;

means for conveying parallel data to said computer;

a shift register responsive on an input thereof to serial data from said receiving means;

means for applying serial data from an output of said shift register to said transmitting means;

means for operating said shift register to simultaneously respond to sequential elements in said received data to store them in sequential elemental storage areas and to apply sequential elements stored in said sequential elemental storage areas of said shift register to said transmitting means;

a buffer register interconnected with said shift register and operative to store parallel data accepted from said computer and to provide parallel data stored therein to said conveying means for conveyance to said computer;

7. The invention in accordance with claim 6 wherein said storage address determining means includes:

a first counter indicating the address of data from said stations;

a second counter indicating the address of data for said stations;

means for stepping said first and second counters to different addresses for data to and from stations whereby different stations receive and transmit data during the same time slot; and a third counter indicating to said computer the station from which a command is received commands for service by the computer in the order from which a command is received.

8. The invention in accordance with claim 6 wherein one or more test data sources are provided; and said monitoring means includes:

monitor register means for storing system data and test data;

means for selecting a predetermined time for causing entry of said system data into said monitor register means during said predetermined time; and manually actuable switch means for causing transmission of said test data to said stations during a selected predetermined time and entry of said test data into said monitor register means.

9. The invention in accordance with claim 8 wherein said monitoring means includes means for displaying a visual representation of said test data and said system data as stored therein.

10. The invention in accordance with claim 8 wherein:

said predetermined selectable time is divided into first and second portions; and said switch means comprises means for selecting from among said first and second portions;

means are provided responsive to the selected portion for storing either system data or test data in said monitor register means.

means for effecting the parallel exchange of data between said shaft register and buffer register whereby serial data received from said stations may be conveyed to said computer in parallel and parallel data received from said computer may be conveyed to said stations in serial form simultaneously during corresponding time slots;

means for indicating time slot sequencing;

means responsive to indicated time slot sequencing for determining the storage addresses in a memory of said computer where data from said stations and for said stations are stored in correspondence with the time slots used for data communication with each of said stations;

means for monitoring system data flow in one or more time slots.

* * * * *

UNITED STATES PATENT OFFICE
CERTIFICATE OF CORRECTION

Patent No. 3,708,785 Dated January 2, 1973

Inventor(s) Edward B. Rawson and Joseph B. Ferguson

It is certified that error appears in the above-identified patent and that said Letters Patent are hereby corrected as shown below:

Column 9, line 20, after the semicolon add the following:

--means for effecting the parallel exchange of data between said shift register and buffer register whereby serial data received from said stations may be conveyed to said computer in parallel and parallel data received from said computer may be conveyed to said stations in serial form simultaneously during corresponding time slots;

means for indicating time slot sequencing;

means responsive to indicated time slot sequencing for determining the storage addresses in a memory of said computer where data from said stations and for said stations are stored in correspondence with the time slots used for data communication with each of said stations;

means for monitoring system data flow in one or more time slots;--.

Column 9, line 30, delete "and" and insert after the semicolon:

--means responsive to predetermined elements in serial data received from a station for indicating a command for service by said computer; and--

Column 9, line 32, after "received" insert a period --.-- and delete "commands for service by the computer in the order from which a command is received."

Column 10, line 22, delete lines 22-37.

Signed and sealed this 29th day of May 1973.

(SEAL)
Attest:

EDWARD M.FLETCHER,JR.
Attesting Officer

ROBERT GOTTSCHALK
Commissioner of Patents